C. T. Belbin,
Oyster Dredge Winder.
No. 109,104. Patented Nov. 8, 1870.
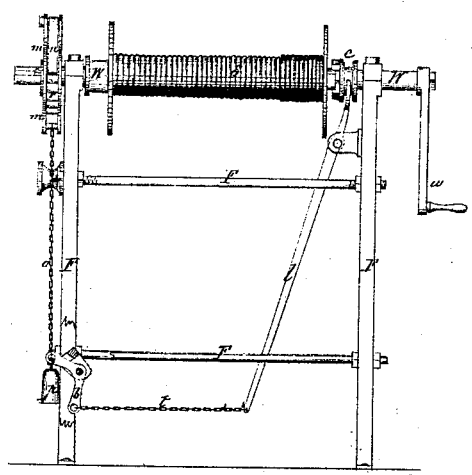
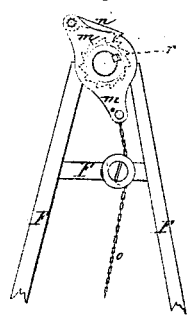
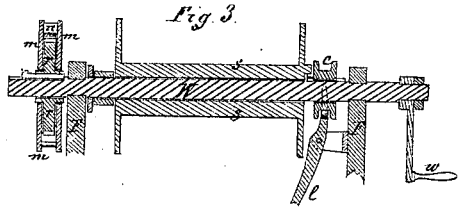
Witnesses:  
Inventor:  
Chas. T. Belbin

United States Patent Office.

CHARLES T. BELBIN, OF BALTIMORE, MARYLAND.

Letters Patent No. 109,104, dated November 8, 1870.

IMPROVEMENT IN OYSTER-DREDGE WINDERS.

The Schedule referred to in these Letters Patent and making part of the same.

*To all whom it may concern:*

Be it known that I, CHARLES T. BELBIN, of Baltimore, in the county of Baltimore and State of Maryland, have invented a new and improved Oyster Dredge-Winder; and I do hereby declare the following to be a full, clear, and exact description of the same, reference being had to the accompanying drawing making a part of this specification, in which—

Figure 1 is a side elevation;

Figure 2, a detached view of the ratchet-lever; and

Figure 3, an axial section of the shaft and parts attached thereto.

This invention relates particularly to that class of windlasses which are used on board of vessels under way for the purpose of hoisting in oyster-dredges, and its object is to prevent the windlass from being suddenly and violently reversed, to the great danger of the men and the machinery, in case of the dredge accidentally catching upon a rock or other immovable obstacle.

To this end it consists in winding the dredge-rope or chain upon a spool upon the windlass, which is ordinarily prevented from turning on the shaft, when the latter is moving in the right direction, by means of a clutch, but is instantly released, automatically, from the clutch the moment the windlass turns backward. The devices by which this object is accomplished I will now proceed to describe in detail.

In the drawing—

F represents the frame of the machine.

W, a windlass, provided with cranks *w w*.

*s*, a spool, mounted on the windlass;

*c*, a clutch, sliding upon the windlass, and engaging with the end of the spool;

*l*, a lever, by which the clutch and spool can be engaged or disengaged;

*r*, a ratchet-wheel, fastened firmly on the opposite end of the windlass;

*m*, a lever, consisting of two parallel metallic plates pivoted loosely on the windlass, one on each side of the ratchet, and bearing against it;

*n*, a hook or pawl, articulated to the upper end of lever *m*, between the two plates, and resting, as shown, upon the ratchet;

*o*, a chain, extending from the lower end of lever *m* down to a bell-crank lever, *b*;

*t*, a chain, connecting the opposite arm of crank *b* with the long arm of lever *l*; and

*p*, a weight, attached to chain *o* or crank *b*, and serving to keep lever *m* in a position nearly as shown in the drawing.

The vessel being in rapid motion, dragging the dredge, which is suspended from the spool by a rope or chain, and the spool being engaged with the clutch, the men commence hoisting the dredge in by means of the cranks *w w*.

So long as the windlass turns in the proper direction it carries the spool with it and winds up the chain. The ratchet *r* (fig. 2) meanwhile turns backward, slipping under the pawl without engaging with it, the lever *m* hanging loosely, as shown in fig. 2.

This will continue to be the relative situation of the parts so long as the dredge drags smoothly along without encountering an obstacle. The instant that it catches in a rock or other impediment, however, it suddenly checks and reverses the motion of the windlass, whereupon the ratchet *r* engages with the pawl *n*, and draws the upper end of lever *m* forward, throwing its lower end back, and causing it to lift upon chain *o*, the action of which, communicated through crank *b*, chain *t*, and lever *l*, disengages the clutch from the spool, allowing the spool to be turned loosely on the shaft while the windlass stands still.

The men at the cranks are thus saved from injury, and the machinery is prevented from breaking. As soon as the windlass stops, weight *p* brings lever *m* and pawl *n* to their proper positions again.

This device, although designed especially for use in dredging, will be equally serviceable in connection with any windlass that is turned by hand and is liable to sudden reverse movements; and it is my intention to thus apply the invention whenever there shall be a demand for it.

Having thus described my invention,

What I claim as new, and desire to secure by Letters Patent, is—

The combination of lever *m*, pawl *n*, and ratchet *r*, with chains *o t*, lever and weight *b p*, or their equivalent, lever *l*, clutch *c*, spool *s*, and windlass W, when constructed to operate substantially as and for the purpose specified.

CHARLES T. BELBIN.

Witnesses:
GEORGE G. H. CANN,
J. F. EWENS.